United States Patent [19]

Vanzeyl

[11] Patent Number: 4,989,921

[45] Date of Patent: Feb. 5, 1991

[54] MINE HOIST BRAKE REGULATOR

[75] Inventor: Clemens J. G. Vanzeyl, Peterborough, Canada

[73] Assignee: General Electric Canada Inc., Mississauga, Canada

[21] Appl. No.: 406,496

[22] Filed: Sep. 13, 1989

[30] Foreign Application Priority Data

Sep. 29, 1988 [CA] Canada .................................. 578890

[51] Int. Cl.[5] .............................................. B60T 7/12

[52] U.S. Cl. ...................................... 303/91; 303/107

[58] Field of Search ............. 188/180, 181 A; 303/20, 303/91, 92, 93, 96, 105, 107, 108, 109, 116

[56] References Cited

U.S. PATENT DOCUMENTS

| | | | |
|---|---|---|---|
| 3,498,682 | 3/1970 | Mueller et al. | 303/109 X |
| 3,547,501 | 12/1970 | Harned et al. | 303/107 |
| 3,586,387 | 6/1971 | Riordan | 303/109 |
| 3,776,357 | 12/1973 | Arai et al. | 303/109 X |
| 3,794,972 | 2/1974 | Van Ostrom | 303/107 X |
| 4,324,387 | 4/1982 | Steinhagen | 188/180 |

FOREIGN PATENT DOCUMENTS

| | | |
|---|---|---|
| 859574 | 12/1970 | Canada . |
| 883111 | 10/1971 | Canada . |
| 922009 | 2/1973 | Canada . |

*Primary Examiner*—Duane A. Reger

[57] ABSTRACT

There is described a hydraulic friction brake for controlling deceleration of a mine hoist which brake includes a pump continually circulating hydraulic braking fluid through a valve. The valve regulates the flow of hydraulic fluid to control braking pressure applied by the brake to brake the mine hoist. The hydraulic friction brake includes a controller for controlling operation of the valve. The controller a comparator for comparing a differentiated signal indicative of hoist speed with the reference signal indicative of a predetermined hoist deceleration to provide a switching output signal having a first output value when the differentiated signal is greater than the reference signal and having a second value when the differentiated signal is less than or equal to the reference signal. The control means also includes an integrator responsive to the output signal to provide a first valve signal that controls the operation of the valve. By integrating the switching output signal it is possible to provide a valve control signal that opens the valve at a rate predetermined and thereby reduce the braking pressure of the brake in proportion to the deceleration of the hoist. Further, when the output signal is indicative of a maximum allowable deceleration rate for the hoist, the integrator provides a constant output signal which maintains the opening of the valve constant. As a result a maximum braking acceleration for the hoist is not exceeded.

8 Claims, 2 Drawing Sheets

MINE HOIST BRAKE REGULATOR

FIELD OF THE PRESENT INVENTION

The present invention relates to the control of a hydraulic friction brake used to control the operation of a mine hoist.

BACKGROUND OF THE PRESENT INVENTION

It is known to combine electrodynamic braking with friction braking in a mine hoist. In the combined scheme, the electrodynamic brake provides the major portion of the braking effort at higher hoist speeds and the friction brake provides the major portion of the braking effort at the lower speeds. The friction brake usually comprises a brake pad that is applied against a surface of the mine hoist. The brake pad is connected to a brake shoe that is in turn connected to a rod. The rod is connected to a piston housed within a chamber. Fluid such as air is forced into the chamber to pressurize same and act against the piston controlling the braking pressure applied by the brake pad against the hoist. As the brake pressure changes so does the deceleration of the hoist.

One such prior art combined braking system for a mine hoist is disclosed in Canadian Patent No. 922,009 issued Feb. 27, 1973 to Peter deh. Eastcott. The combined braking system has a regulator which regulates friction braking according to hoist deceleration. The friction brakes are applied to supplement the electrodynamic brake so as to control stopping of the hoist according to a prescribed deceleration pattern. This is achieved by comparing the actual deceleration of the mine hoist with a reference signal representing a hoist deceleration program to control the braking pressure applied by the friction brakes to hold the deceleration of the hoist to the program irrespective of the braking effort provided by the electrodynamic brake.

While Canadian Patent No. 922,009 teaches the use of combined regenerative electrodynamic braking and friction braking, it is current practise not to rely on the regenerative braking effect of the motor but to rely solely on the friction brake to decelerate the mine hoist in emergency situations. The aforementioned patent is silent on the type of friction brake used, however, the teachings of the aforementioned patent have been implemented by the assignee of the aforementioned patent in respect of air brakes. The air brakes included a pinch valve which closed after a predetermined amount of air exited the chamber to maintain the braking pressure. The air remained in the chamber providing a static pressure until such time as a pressure change in brake application was required. In the event more braking was required, the pinch valve opened and additional air escaped out of the chamber until the required pressure was obtained. At this time the pinch valve was closed. Such an air brake and pinch valve were well adapted to reducing braking pressure applied by the brakes to the hoist at a rate according to a deceleration program for the hoist as taught in the aforementioned Canadian Patent No. 922,009.

In the last few years, hydraulic brakes have become the preferred choice of friction brake used in mine hoist applications. This is due to the economic considerations. However, the preferred control for a hydraulic friction brake requires continual flow of the fluid, such as oil for example, through the brake. Brake pressure in the braking chamber is a result of a pressure drop across an outlet orifice of the chamber which orifice continually remains open to maintain braking pressure. In view of this, reducing braking pressure applied by a hydraulic brake to the hoist at a rate according to a deceleration program for the hoist in the manner taught by the aforementioned Canadian Patent No. 922,009 heretofore has not been achieved since the principle taught in this patent revolves around the use of a friction brake where the fluid in the braking chamber is air and remains at a static pressure.

OBJECTS OF THE PRESENT INVENTION

It is an object of the present invention to provide a hydraulic friction brake for controlling the deceleration of a mine hoist using a brake regulator with speed feedback.

It is another object of the present invention to provide a hydraulic friction brake where the braking pressure of the hydraulic brake changes in a predetermined manner to control the deceleration of a mine hoist.

SUMMARY OF THE INVENTION

In accordance with a broad aspect of the present invention there is provided a hydraulic friction brake for controlling deceleration of a mine hoist. The brake includes pump means continually circulating hydraulic braking fluid through a valve means. The valve means regulates flow of hydraulic fluid to control braking pressures applied by the brake for braking the mine hoist. The brake further includes control means for controlling operation of the valve means. The control means comprises means for sensing the speed of the hoist and providing a signal representing the speed, means for differentiating the speed signal to obtain a differentiated signal representing the rate of change of the speed of the mine hoist, and integration means responsive to the differentiated signal to provide a first valve signal that controls the operation of the valve means. The first valve signal decreases at a predetermined rate to correspondingly control the opening of the valve means and proportionally reduce the braking pressure of the brake.

By providing the integration means it is possible to allow the brake pressure to reduce the braking force applied by the brake against the hoist at a preselected rate determined by the integrator irrespective of the rate of deceleration sensed by the control. The integration means functions in response to the control system sensing hoist deceleration.

In accordance with one aspect of the present invention there is provided a hydraulic friction brake for controlling deceleration of a mine hoist which brake includes pump means continually circulating hydraulic braking fluid through a valve means. The valve means regulating flow of hydraulic fluid to control braking pressure applied by the brake to brake the mine hoist. The friction brake further includes control means for controlling operation of the valve means. The control means includes means for sensing the speed of the hoist and providing a signal representing the speed and means for differentiating the speed signal to obtain a differentiated signal representing the rate of change of the speed of the mine hoist. The control means further includes means for producing a reference signal representing a predetermined hoist deceleration rate and means for comparing the differentiated signal with the reference signal to provide a switching output signal having a first value when the differentiated signal is greater than the reference signal and having a second value when the differentiated signal is less than the reference signal. The control means also includes integration means responsive to the output signal to provide a first valve signal that controls the operation of the valve means. The valve signal decreases at a predetermined rate to correspondingly control the opening of the valve means and proportionally reduce the braking pressure of the brake when the output signal has its second value and the valve signal remains constant maintaining opening of the valve means and the braking pressure of the brake constant when the output signal is at its first value.

By providing a switching output signal at the output of the comparing means and an integration means responsive to this output signal it is possible to provide a valve control signal that opens the valve means at a rate predetermined by the integrator means for as long as the second value of the output signal is present and thereby reduce the braking pressure of the brake in proportion to the deceleration of the hoist. Further, when the output signal has its first value indicative of a maximum allowable deceleration rate for the hoist, the integration means provides a constant output signal which maintains the opening of the valve means constant. As a result a maximum braking deceleration for the hoist is not exceeded.

It is envisaged that the brake may further include a second valve signal representative of a minimum braking pressure for the brake. The second valve signal and the first valve signal may be combined to control the braking pressure of the brake. The brake may include a third valve signal representative of a brake release pressure which is combined with the first and second valve signals to control the braking pressure of the brake. Additionally, the brake may include a fourth valve signal representative of a preset brake pressure which is combined with the first, second and third valve signals to control the braking pressure of the brake. The brake may further include a fifth valve signal representative of a set brake pressure which is combined with the first, second third, and fourth valve signals to control the braking pressure of the brake.

It is also within the realm of the present invention to provide a controller for operating a mine hoist brake in accordance with means as set out hereinabove and to provide a method of controlling a mine hoist brake as described hereinabove.

BRIEF DESCRIPTION OF THE DRAWINGS

For a better understanding of the nature and objects of the present invention reference may be had by way of example to the accompanying diagrammatic drawings in which.

DETAILED DESCRIPTION OF THE PRESENT INVENTION

Figure 1:
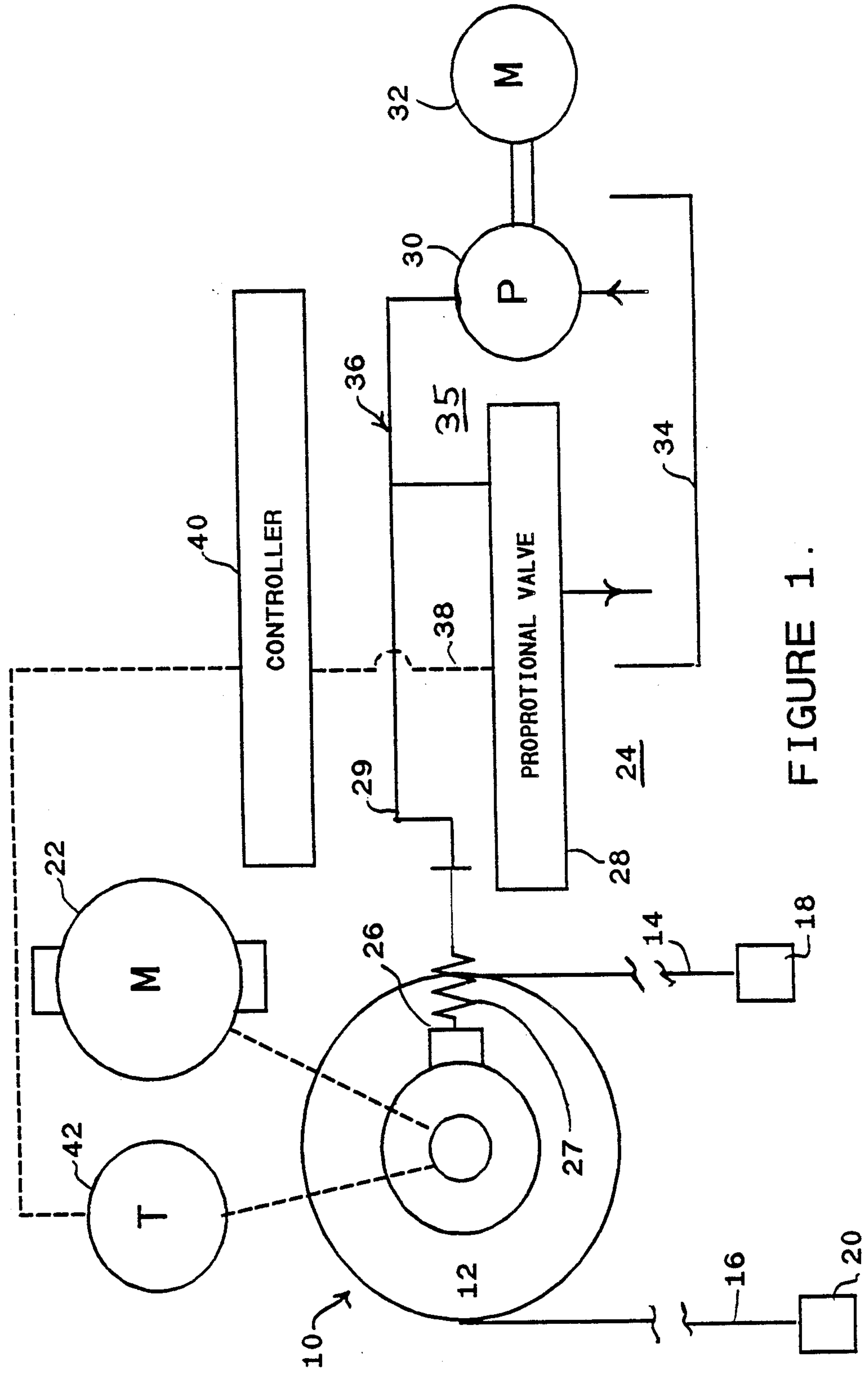
FIG. 1 is schematic representation of a mine hoist and hydraulic braking system; and, FIG. 2 is an electrical schematic of the valve control for the brake of FIG. 1.

Referring to FIG. 1 there is shown a mine hoist 10 having a drive wheel 12 for driving ropes 14 and 16 secured respectively to conveyances 18 and 20. Ropes 14 and 16 are operated by wheel 12 such that rotation of wheel 12 results in one of the conveyances being raised while the other conveyance is lowered depending on the rotation of the wheel. Rotation of the wheel 12 is powered by motor 22 and braking of the wheel is controlled by brake system 24.

In FIG. 1 the brake system is shown schematically to include a brake 26 and a spring 27. The spring 27 biases the brake into engagement with the wheel 12 of the hoist. The force exerted by the brake 26 is controlled by proportional valve 28. Proportional valve 28 effectively controls the pressure of the fluid supplied along conduit 29 to the brake 26. It should be understood that the brake 26 is normally connected to a rod which is affixed to the end of a piston. The piston will move reciprocally within a piston cylinder. Cylinder will include an inlet/-outlet through which hydraulic fluid will be pumped into and out of the cylinder under pressure from conduit 29. The pressure of the fluid in the cylinder is regulated by the proportional valve means 28 such that as the fluid pressure in the cylinder decreases the spring cause the brake to exert more force against the wheel 12 of the mine hoist.

In the hydraulic brake control circuit shown generally at 35, hydraulic fluid such as oil is pumped from tank 34 by pump 30 through proportional valve 28 returning to tank 34. The pump 30 is powered by prime mover or motor 32. The proportional valve controls the pressure of the fluid in conduit 36 and also branch conduit 29 which communicates the fluid to the brake 26.

The proportional valve in response to a valve control signal at 38 acts to vary the opening of the valve and consequently the pressure drop across the valve. As the valve opens the pressure drop across the valve decreases and the pressure of the hydraulic fluid in conduits 36 and 29 and the piston cylinder decreases. This will result in a increase in the braking pressure applied by the brake 26 against the mine hoist wheel 12.

Figure 2:
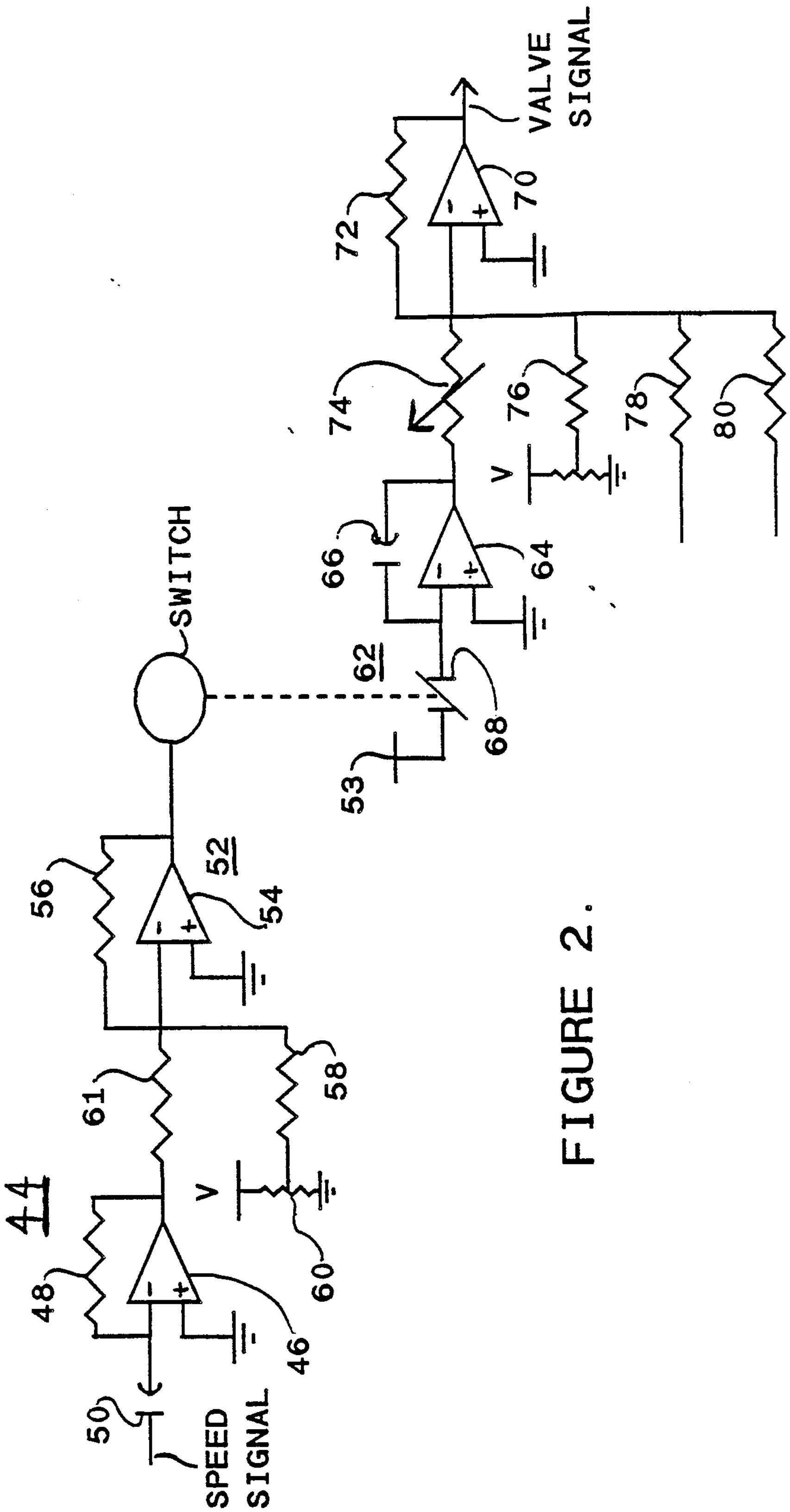

The valve control signal or valve signal is derived in controller 40 as a function of mine hoist wheel speed measured by tachometer 42. Referring to FIG. 2 the controller 40 has a differentiator 44 which includes an amplifier 46 with a variable feedback resistance 48 and an input capacitance 50. The time constant of the differentiator is controlled by the values of resistor 48 and capacitor 50. The output of amplifier is a differentiated signal which is inverted with respect to the input and represents the actual deceleration of the hoist or the rate of change of the speed of the hoist once the brakes of the hydraulic brakes are applied.

The differentiated signal is summed or compared with a reference signal at comparing means or comparator 52. Comparator 52 includes an amplifier 54 and a feedback resistor 56. The inverting input of comparator 52 is connected through resistor 61 to the differentiating signal and through resistor 58 to a reference signal at 60. Reference signal 60 is indicative of the predetermined hoist deceleration rate above which the hoist is not to decelerate. The comparator has a switching output signal that has one value which causes integrator 62 to integrate a reference signal provided at 53 over the time that the one value is present. The comparator has another value which switches reference value 53 out of the integrator circuit 62 to cause the output of the integrator 62 to remain constant.

Integrator 62 includes an amplifier 64, a feedback capacitance 66 and a resistance 68. The resistor 68 and the capacitance 64 are chosen to provide a ramp of predetermined slope which determines the time constant over which the integrator operates and hence the predetermined rate at which the output signal of the integrator decreases with time as long as the output of the comparator 52 remains at its first value. The output of the integrator 62 may be referred to as the first valve signal.

Following the integrator 62 is a summing amplifier 70 having a feedback resistance 72. The inputs to summing amplifier are weighted through resistances 74, 76, 78, and 80. The first valve signal proportional to valve deceleration of the hoist is provided through resistor 74 which also sets the minimum pressure. A preset reference is provided through resistor 76 to initially set brake pressure for application of the brakes to the mine hoist. A set reference is applied through resistance 78 to control the set brake pressure applied and a release reference is applied to set the minimum brake pressure applied. The signals provided through each of the resistors 74, 76, 78, and 80 are combined in summing amplifier to provide a valve signal output or a proportional valve signal that controls the position of the valve 28 (FIG. 1).

In operation, once the hoist is required to come to a stop the brakes are applied at a brake pressure determined by the set and release reference values through resistors 78 and 80. The brake pressure will not be allowed to exceed a predetermined amount due to the signal provided by the release reference through resistor 80 and the brake pressure will not drop below a predetermined amount set by the set reference through resistor 78.

As the hoist decelerates the change in speed is sensed by the tachometer 42 and converted by differentiator 44 into a deceleration signal. As long as this deceleration signal remains below a predetermined deceleration rate provided by reference 60, the comparator 52 outputs a value that switches the integrator 62 into an integrating mode thereby reducing the value signal at a rate determined by the integrator's time constants. As the valve signal decrease this opens the valve proportionally and reduces the brake pressure. In the event that the deceleration of the hoist exceeds the predetermined deceleration rate set by reference 60, the comparator 52 switches the integrator 62 into a constant output mode whereby the valve signal of the intregrator remains constant. This causes the proportional valve to maintain its position and hold the braking pressure constant until such time as the deceleration of the hoist is reduced to an acceptable value.

What I claim as new and desire to secure by Letters Patent of the United States is:

1. A hydraulic friction brake for controlling deceleration of a mine hoist comprising:

pump means continually circulating hydraulic braking fluid through a valve means, the valve means regulating flow of hydraulic fluid to control braking pressure applied by the brake for braking the mine hoist; and, control means controlling operation of the valve means including:

means for sensing the speed of the hoist and providing a signal representing the speed, means for differentiating the speed signal to obtain a differentiated signal representing the rate of change of the speed of the mine hoist, means for producing a reference signal representing a predetermined hoist deceleration rate, means for comparing the differentiated signal with the reference signal to provide an output signal having a value when the differentiated signal is less than the reference signal, and integration means responsive to the output signal to provide a first valve signal that controls the operation of the valve means, the first valve signal decreasing at a predetermined rate to correspondingly control the opening of the valve means and proportionally reduce the braking pressure of the brake.

2. A hydraulic friction brake for controlling deceleration of a mine hoist comprising:

pump means continually circulating hydraulic braking fluid through a valve means, the valve means regulating flow of hydraulic fluid to control braking pressure applied by the brake for braking the mine hoist; and, control means for controlling operation of the valve means including:

means for sensing the speed of the hoist and providing a signal representing the speed, means for differentiating the speed signal to obtain a differentiated signal representing the rate of change of the speed of the mine hoist, means for producing a reference signal representing a predetermined hoist deceleration rate, means for comparing the differentiated signal with the reference signal to provide a switching output signal having a first value when the differentiated signal is greater than the reference signal and having a second value when the differentiated signal is less than the reference signal, and integration means responsive to the output signal to provide a first valve signal that controls the operation of the valve means, the first valve signal decreasing at a predetermined rate to correspondingly control the opening of the valve means and proportionally reduce the braking pressure of the brake when the output signal has its second value and the first valve signal remaining constant maintaining the opening of the valve means and the braking pressure of the brake constant when the output signal is at its first value.

3. The brake of claim 2 further including a second valve signal representative of a minimum braking pressure for the brake, the second valve signal and the first valve signal being combined to control the braking pressure of the brake.

4. The brake of claim 3 further including a third valve signal representative of a brake release pressure which is combined with the first and second valve signals to control the braking pressure of the brake.

5. The brake of claim 4 further including a fourth valve signal representative of a preset brake pressure which is combined with the first, second and third valve signals to control the braking pressure of the brake.

6. The brake of claim 5 further including a fifth valve signal representative of a set brake pressure which is combined with the first, second, third and fourth valve signals to control the braking pressure of the brake.

7. A method of controlling a hydraulic brake to control deceleration of a mine hoist comprising the steps of:

continually circulating hydraulic braking fluid through a valve and regulating the valve opening to control braking pressure applied by the brake for braking the mine hoist; and, controlling operation of the valve including the steps of:

(i) sensing the speed of the hoist and providing a signal representing the speed, (ii) differentiating the speed signal to obtain a differentiated signal representing the rate of change of the speed of the mine hoist, (iii) producing a reference signal representing a predetermined hoist deceleration rate, (iv) comparing the differentiated signal with the reference signal to provide a switching output signal having a first value when the differentiated signal is greater than the reference signal and having a second value when the differentiated signal is less than the reference signal, and (v) opening the valve at a predetermined rate responsive to the second output signal being present to proportionally reduce the braking pressure of the brake and maintaining the opening of the valve constant to maintain the braking pressure constant in response to the first output signal being present.

8. A controller for controlling a hydraulic friction brake having a pump means continually circulating hydraulic braking fluid through a valve means where the valve means regulates flow of hydraulic fluid to control braking pressure applied by the brake for braking a mine hoist, the controller comprising:

means for sensing the speed of the hoist and providing a signal representing the speed, means for differentiating the speed signal to obtain a differentiated signal representing the rate of change of the speed of the mine hoist, means for producing a reference signal representing a predetermined hoist deceleration rate, means for comparing the differentiated signal with the reference signal to provide a switching output signal having a first value when the differentiated signal is greater than the reference signal and having a second value when the differentiated signal is less than the reference signal, and integration means responsive to the output signal to provide a first valve signal that controls the operation of the valve means, the first valve signal decreasing at a predetermined rate to correspondingly control the opening of the valve means and proportionally reduce the braking pressure of the brake when the output signal has its second value and the first valve signal remaining constant maintaining the opening of the valve means and the braking pressure of the brake constant when the output signal is at its first value.

* * * * *